(12) United States Patent
Østergaard et al.

(10) Patent No.: US 8,777,586 B2
(45) Date of Patent: Jul. 15, 2014

(54) ROTATIONAL DIRECTION INDICATOR

(75) Inventors: Lars Østergaard, Randers NV (DK);
Carsten Nørgård, Randers NV (DK)

(73) Assignee: Grundfos Management a/s, Bjerringbro (DK)

( * ) Notice: Subject to any disclaimer, the term of this patent is extended or adjusted under 35 U.S.C. 154(b) by 754 days.

(21) Appl. No.: 12/994,549

(22) PCT Filed: Apr. 27, 2009

(86) PCT No.: PCT/EP2009/003055
§ 371 (c)(1),
(2), (4) Date: Feb. 9, 2011

(87) PCT Pub. No.: WO2009/143946
PCT Pub. Date: Dec. 3, 2009

(65) Prior Publication Data
US 2011/0123375 A1    May 26, 2011

(30) Foreign Application Priority Data
May 28, 2008   (EP) .................................... 08009676

(51) Int. Cl.
*F04B 49/00*      (2006.01)
*G01F 1/28*       (2006.01)
*F04D 29/58*      (2006.01)
(52) U.S. Cl.
CPC ................ *F04D 29/584* (2013.01); *G01F 1/28* (2013.01); *F04B 2205/05* (2013.01)
USPC .......... 417/63; 73/861.75; 73/861.74
(58) Field of Classification Search
CPC ....... F04D 25/082; F04D 29/588; G01F 1/28; G01F 1/07
USPC ........... 417/423.8, 43, 63; 310/60 R; 415/26, 415/47, 118; 73/861.74, 861.75; 416/61
See application file for complete search history.

(56) References Cited

U.S. PATENT DOCUMENTS 2,121,651 A * 6/1938 Claytor .................... 200/81.9 R
2,205,281 A * 6/1940 Claytor .................... 200/81.9 R
(Continued)

FOREIGN PATENT DOCUMENTS

DE    2532436    *   2/1977   ................. 73/861.74
DE    2532436 A1     2/1977
(Continued)

OTHER PUBLICATIONS

Int'l Search Report issued on Jun. 30, 2009 in Int'l Application No. PCT/EP2009/003055.

*Primary Examiner* — Charles Freay
*Assistant Examiner* — Alexander Comley
(74) *Attorney, Agent, or Firm* — Panitch Schwarze Belisario & Nadel LLP

(57) ABSTRACT

The inventive rotational direction indicator for an electric motor having a cooling fan has a baffle element movable between two positions and which can be arranged on an electric motor with a cooling fan in such a way that the baffle element is positioned in an airstream of the cooling fan whose direction depends on the rotational direction of the electric motor. The baffle element is respectively moved into one of its two positions by the electric motor as a function of the direction of the airstream. The rotational direction indicator has a display unit designed to visually indicate the position of the baffle element and can be arranged on an outer side of the electric motor. The rotational direction indicator has a display actuating unit which connects the display unit and baffle element to one another, and transmits the position of the baffle element to the display unit.

1 Claim, 4 Drawing Sheets

(56) References Cited

U.S. PATENT DOCUMENTS 2,227,291 A * 12/1940 Wittmann ............... 200/81.9 R
3,696,672 A * 10/1972 Lindsay .................. 73/170.07
4,479,115 A * 10/1984 Holzhauer ................... 340/611
4,955,785 A *  9/1990 Cohen ............................ 415/26
5,221,186 A *  6/1993 Machin ........................... 416/61
6,730,927 B1 *  5/2004 Smith et al. ................... 250/573

FOREIGN PATENT DOCUMENTS

FR      2512853  A1    3/1983
GB      2107098  A1    4/1983

* cited by examiner

Fig.1
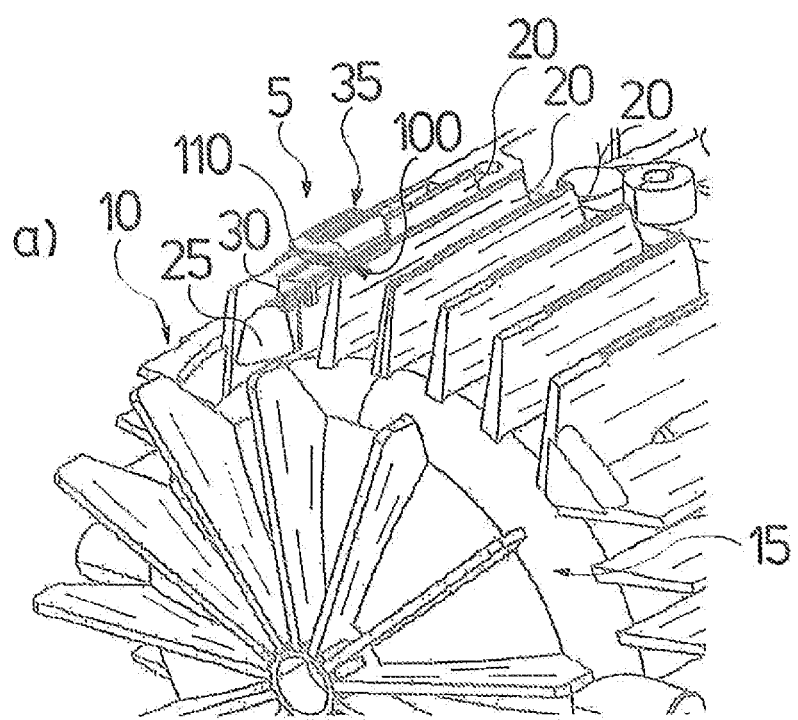
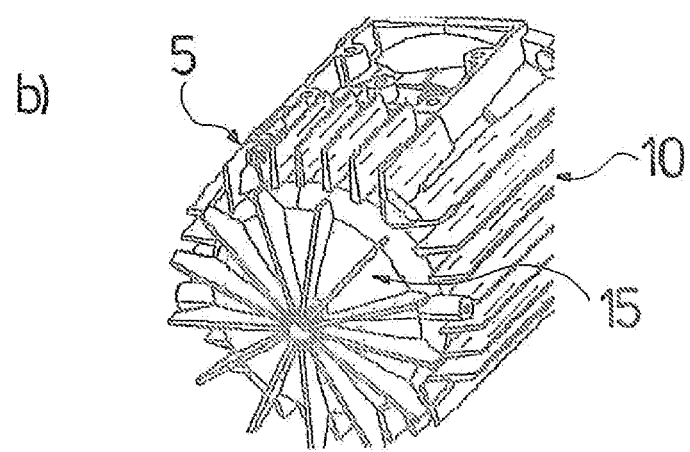

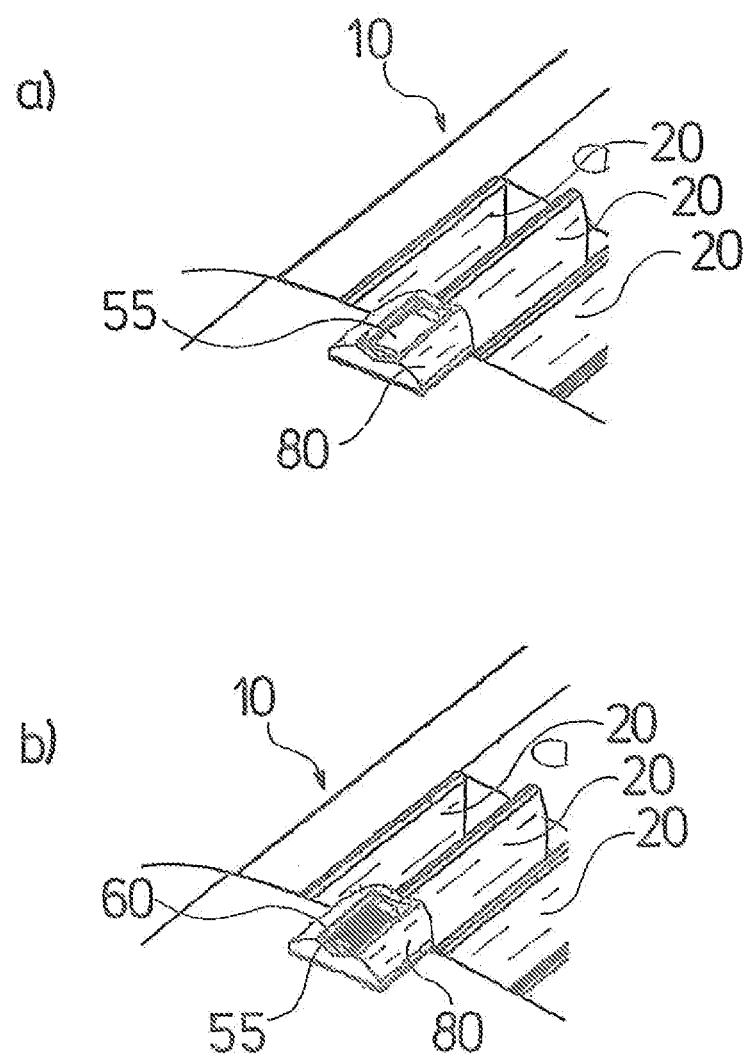

ROTATIONAL DIRECTION INDICATOR

CROSS-REFERENCE TO RELATED APPLICATIONS

This application is a Section 371 of International Application No. PCT/EP2009/003055, filed Apr. 27, 2009, which was published in the German language on Dec. 3, 2009, under International Publication No. WO 2009/143946 A1 and the disclosure of which is incorporated herein by reference.

BACKGROUND OF THE INVENTION

The invention relates to a rotational direction indicator for an electric motor, to an electric motor and to a pump assembly.

Electric motors are regularly to be operated in a preferred rotational direction, wherein the rotational direction is directed to the application purpose of the apparatus driven by the electric motor. This for example is of particular relevance with centrifugal pumps which are driven by a three-phase a.c. motor. If the pump is operated in the wrong rotational direction, this results in a significantly reduced pump efficiency. An operation of the electric motor in the wrong rotational direction, for example with a three phase a.c. motor, may originate from an unintended commutation of two phases on connection to a voltage supply.

It is therefore necessary on connection of an electric motor, to control whether the rotational direction of the electric motor corresponds to the envisaged rotational direction. A signal device for signaling a wrong rotational direction of an electric motor is known for example from the document DT 25 32 436 A1. A signal device is disclosed in this, which is arranged on a cooling fan, within a fan housing. With regard to the signal device, a movable tongue is moved by the airflow of the cooling fan into the fan wheel, given the wrong rotational direction of the electric motor. There, the tongue is hit by the blades of the fan wheel and causes a rattling noise which signalizes a wrong rotational direction.

The tongue of such a signal device disadvantageously is subjected to a large wear, when this is hit by the fan wheel. Furthermore, such a signal device only provides an acoustic signal. For example, a rotational control is difficult with this in noisy surroundings. It is further disadvantageous, that the correct rotational direction is set in a fixed manner with regard to the signal device. It is not possible to select the desired rotational direction in the individual case.

BRIEF SUMMARY OF THE INVENTION

It is therefore the object of the invention, to create a rotational direction indicator, by way of which the rotational direction of an electric motor may be recognized from the outside. Moreover, it is the object of the invention, to provide an electric motor as well as a pump assembly with an electric motor, with a rotational direction indication of the electric motor.

The rotational direction indicator according to the invention for an electric motor with a cooling fan comprises an onflow element movable between two positions. This may be arranged on an electric motor with a cooling fan, in a manner such that the onflow element is situated in an airflow of the cooling fan, whose flow direction is dependent on the rotational direction of the electric motor. In this arrangement, the onflow element is moved in each case into one of its two positions depending on the direction of this airflow. Moreover, the rotational direction indicator comprises a display unit which is designed for a visual display of the position of the onflow element. Thereby, the display may be arranged on an outer side of the electric motor. The rotational direction indicator according to the invention furthermore comprises a display actuating unit. This display actuating unit connects the display unit and the onflow element to one another, and transmits the position of the onflow element to the display unit. Thereby, the display unit may be set in dependence on the position of the onflow element, via the display actuating unit. Since the position of the onflow element is dependent in the direction of the airflow in the cooling fan and thus on the rotational direction of the electric motor, thus the rotational direction of the electric motor may be displayed by the display unit. Advantageously, both rotational directions of the electric motor may be displayed in this manner. With this, the rotational direction indicator advantageously permits a control of the rotational direction also when the correct rotational direction is not set in a fixed manner. It is thus possible to freely select the correct rotational direction in the individual case, without modifications of the rotational direction indicator being necessary.

The onflow element is preferably designed in a two-dimensional manner, so that the onflow by way of the airflow may be efficiently converted into a movement of the onflow element. Thereby, the onflow element is preferably arranged transversely, in particular perpendicularly to the airflow. In this manner, the airflow may easily move the onflow element, for example pivot it, displace it or elastically deform it, which here is to be included under the term movement. The display actuating unit connects the onflow element and display unit to one another in a preferably mechanical manner and mechanically transmits the position or deflection or deformation of the onflow element to the display unit. Alternatively, the connection or transmission may also be effected in an electrical, pneumatic or hydraulic manner.

Preferably, with regard to the rotational direction indicator according to the invention, the onflow element is arranged in a pivotable manner. Further preferably, the onflow element has an adequately high stiffness with respect to an air onflow. In this manner, the air onflow onto the onflow element efficiently leads to a pivot movement of the onflow element and not only to a deformation. With this, the two positions, into which the onflow element may be moved, are characterized by the two pivot directions, into which the onflow element may be deflected by the airflow. Further preferably, the onflow element is articulated along a surface edge which is orientated perpendicularly to the direction of the airflow, i.e. the pivot axis runs along this surface edge.

Alternative designs may for example comprise an elastic leaf as an onflow element, which is fixed in one region and which has at least one free region which is elastically deflectable by way of onflow by the airflow. With such a design, the transmission of the position of the onflow element to the display element in a purely mechanical manner may be technically complicated. For this reason therefore, further preferably, electrical contacts may be closed or opened by the deflection for example, or elastic bending may be converted into electrical signals which may be transmitted to the display unit.

In preferred design of the invention, the display unit comprises a pivotable display element by way of whose position the position of the onflow element may be displayed. A visual display of the position of the onflow element may be effected in a simple manner, for example in the manner of a dial, by way of such a pivotable display element. In particular, with designs with which the onflow element as well as a display element of the display unit is designed in a pivotable manner, such a rotational direction indicator may be realized mechanically in a simple manner.

Preferably, the display actuating unit of the rotational direction indicator according to the invention comprises a shaft which connects the onflow element and the display element. In particular, the onflow element and the display element are in each case connected to the shaft in a rotationally fixed manner. Thereby, the componentry formed by the onflow element, the shaft and the display element, is preferably rotatably mounted on the shaft, i.e. the shaft is rotatably received in holding or bearing elements. The shaft thus forms the pivot axis for the onflow element as well as the display element. Accordingly, a deflection of the onflow elements results directly in a pivot movement of the display element, since the display element and onflow element are coupled to one another in a rotationally fixed manner.

Further preferably, the common centre of gravity of the onflow element, shaft and display element lies on the shaft axis. In such an embodiment, the position of the onflow element is not influenced by gravity. As a result, in particular the display of the display element is not adulterated by gravity. Such a rotational direction indicator may be rotated in an infinite manner about the shaft connecting the onflow element and display element, without this orientation influencing the display of the display element. Accordingly, such a rotational direction indicator is freely positionable along the periphery of a cooling fan.

Preferably, the rotational direction indicator is designed for fastening on a cooling rib of the electric motor and preferably may be clipped onto the cooling rib or may be clamped between two cooling ribs. Further preferably, the rotational direction indicator is designed for fastening on a housing of the electric motor or the cooling fan, and is preferably designed such that it may be clipped or locked onto the housing. With this, the rotational direction indicator may be simply attached on the electric motor. Moreover, an electric motor may be simply retrofitted for the rotational direction indication, since no fastening elements need to be provided on the electric motor.

Preferably, with regard to the rotational direction indicator, the onflow element may be arranged at such a position of an electric motor with a radial fan, that it is situated in a tangential component of the airflow of the radial fan. With such a radial fan, the tangential component of the airflow is dependent on the rotational direction of the electric motor. For this reason, a corresponding arrangement of the rotational direction indicator is particularly suitable for determining and the display of the rotational direction of the electric motor.

The electric motor according to the invention with a cooling fan comprises a rotational direction indicator as described above. Preferably it is the case of a three-phase a.c. motor with which a faulty connection to a voltage supply may easily occur, so that it is important to recognize the correct rotational direction.

Preferably, the cooling fan is a radial fan. This thereby is driven by a motor shaft of the electric motor, so that the rotational direction of the fan corresponds to the rotational direction of the motor. The rotational direction indicator in this embodiment of the electric motor is designed with a display actuating unit which comprises a shaft connecting the onflow element and the display element. The onflow element is arranged in a tangential component of the airflow of the cooling fan. The shaft connecting the onflow element and the display element thereby extends preferably parallel to the motor shaft axis. The display unit thereby is arranged on the outer side of the electric motor. In particular with embodiments of the rotational direction indicator with the common centre of gravity of the onflow element, shaft and display element lying on the shaft axis, the rotational direction indicator may be inclined by any angle, without adulterating the result. For this reason, the rotational direction indicator may also be arranged at any position along the periphery of the electric motor.

The pump assembly according to the invention comprises such a previously described electric motor. It is indeed with pump assemblies that the rotational direction of the electric motor and thus of the pump is of particular relevance, since the pump efficiency of the pump depends essentially on the rotational direction. The pump assembly according to the invention therefore ensures a reliable starting operation with an uncomplicated control of the pump efficiency.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 1a, b a rotational direction indicator according to the invention, on an electric motor with a cooling fan, in a perspective detail view, FIGS. 2a, b the rotational direction indicator according to FIG. 1, in a perspective exploded representation, FIG. 2c the rotational direction indicator according to FIGS. 1 and 2, in a perspective representation, FIG. 3a the rotational direction indicator according to FIGS. 1-3 on an electric motor, with a cooling fan and with a display unit which is fastened on a fan housing, in a perspective detail view, FIG. 3b the rotational direction indicator in an arrangement according to FIG. 3a, in a perspective view and FIGS. 4a, b the rotational direction indicator according to FIGS. 1-3, in an arrangement according to FIGS. 3a, b, in a perspective detail view.

DETAILED DESCRIPTION OF THE INVENTION

Figure 2:
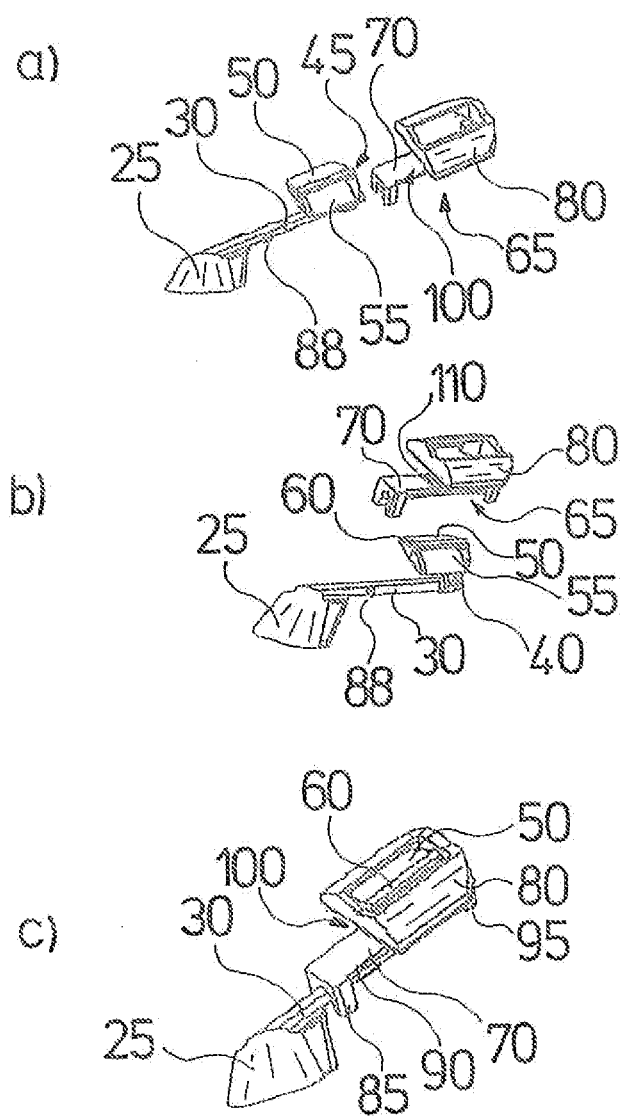

The rotational direction indicator 5 in this embodiment example, as is represented in FIG. 1a, b, is arranged on an electric motor 10 with a cooling fan 15. For this, the rotational direction indicator 5 is attached between two cooling ribs 20 of the electric motor 10.

The rotational direction indicator 5 comprises a two-dimensionally designed lamella 25 as an onflow element, a shaft 30 which, as a display actuating unit, is connected to the lamella 25, and a display unit 35 which is coupled to the shaft 30. The rotational direction indicator 5, for the display of the rotational direction, is located in a tangential component of the airflow of the rotating radial fan 15. The direction of the tangential airflow thereby depends directly on the rotational direction of the radial fan 15 and thus of the electric motor 10. In the arrangement represented in the FIGS. 1a, b, the lamella 25 pivotably projects into the tangential airflow of the radial fan 15. The lamella 25 is subjected to onflow on one side by the tangential airflow, depending on the rotational direction of the radial fan 15. This onflow deflects the lamella 25, so that this pivots about the longitudinal axis of the shaft 30 into that direction, in which the tangential component of the airflow is directed. The pivot direction of the lamella 25 therefore reliably indicates the rotational direction of the radial fan 15. For displaying the rotational direction, the pivot direction of the lamella 25 is transmitted via the shaft 30 as a display actuating unit to the display unit 35. With this, the pivot direction of the lamella 25, and thus also the rotational direction of the radial fan 15, may be read off on the display unit 35.

The operating manner of the rotational direction indicator 5 for this is explained in more detail by way of FIGS. 2*a-c*. The lamella 25, for indicating the rotational direction, is fastened on an axial end of the shaft 30 and is arranged for the perpendicular onflow by the tangential component of the airflow. Thereby, the lamella 25 extends away from the axis of the shaft 30 in merely one radial direction. In this manner, the onflow onto the lamella 25 leads to a deflection with a rotation of the shaft 30 about its longitudinal axis. This rotation of the shaft 30 is utilized for actuating the display of the display unit 35. For this, the shaft 30 is designed as one piece or as one part with a display element in the form of a display arm 40, which is located at the end of the shaft 30, said end being directed away from the lamella 25. This display arm 40 extends likewise in a radial direction from the axis of the shaft 30, so that the radial directions of the lamella 25 and display arm 40 enclose an angle of 180°. This arrangement on the one hand permits the lamella 25 to project into the tangential airflow of the radial fan 15 and simultaneously permits the display arm 40 for the display unit 35 to point away from the electric motor 10. Accordingly, the parts of the display unit may be arranged in a simple manner on the outside on the motor. In particular, the rotational direction of a motor may be recognized visually from the outside in a simple manner. On the other hand, this construction of the rotational direction indicator 5 permits a particularly advantageous mounting, as is explained further below.

The free end of the display arm 40 ends in a display tip 45. Two differently colored display surfaces 50, 55 border this display tip 45. Thereby, the display surfaces 50, 55 are orientated such that the two display surfaces 50, 55 contact in an edge 60 which is parallel to the longitudinal axis of the shaft 30. This contact edge 60 projects radially outwards in a web-like manner and simultaneously serves as an abutment 60. The surfaces 50, 55 form an obtuse angle which is open to the shaft 30 and point away from the display arm 40 in a symmetrical manner. The display-side axial end of the shaft 30, the display arm 40, the display tip 45 and the display surfaces 50, 55 are accommodated in a display housing 65. This display housing 65 consists of a fork 70 for the rotatable accommodation of the shaft 30 as well as a panel 80.

The display housing 65 thereby is designed for the rotational fixed assembly on the electrical motor 10 and permits a rotational movement of the shaft 30 as well as the pivot movement of the display arm 40, display tip 45 and the display surfaces 50, 55. For this, a prong pair 85 of the fork 70 engages around the shaft 30 in a manner orientated perpendicularly to the longitudinal axis of the shaft 30. For the axial locking of the shaft 30 comprises an abutment 88 which bears on the side of the prong pair 85, said side facing the display arm 40. This abutment 88 prevents an axial displacement of the shaft 30 in the direction directed away from the display arm 40. The fork 70 has a two-dimensionally designed connection web 90 which is angled at a right angle to the prong pair 85, in a manner such that it extends parallel to the shaft 30 up to that end, at which the display arm 40 is located. The shaft 30 at this axial end is rotatably mounted in a second prong pair 95 located on the fork 70. The panel 80, at the axial end of the connection web 90, is attached on the fork 6, in a manner such that it is adequately distanced to the connection web 90 of the fork 70 in the direction normal to the longitudinal axis of the shaft 30. This distance has been found to be necessary, in order to lead the display unit past the housing of a cooling fan, as is explained further below.

The panel 80, whose longitudinal axis is orientated parallel to the longitudinal axis of the shaft 30, has roughly the shape of a segment of a circular cylinder. The plane surface of the cylinder segment thereby faces the shaft 30 and is orientated perpendicularly to the display arm 40. A viewing window which is designed as a notch of the panel 80, is located on the peripheral surface of the panel 80, said peripheral surface 50, 55 being away from the axis. Thereby, in each case one of the two display surfaces is visible in the viewing window of the panel 80, depending on the pivot direction of the display arm 40. As to which display surface is visible in each case in the viewing window of the panel 80, as a result depends on the direction of the deflection of the lamella 25 and thus on the direction of the tangential component of the airflow of the cooling fan 15.

Figure 3:
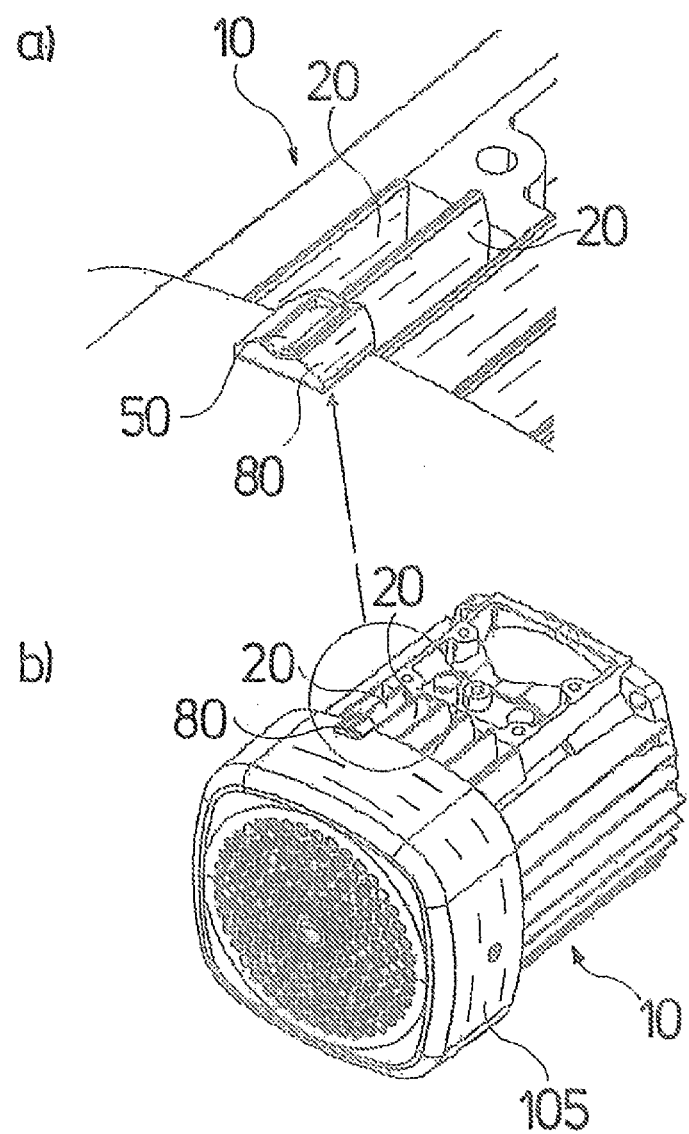

The two display surfaces 50, 55 are e.g. differently colored, in order to ensure an easy visual control of the rotational direction. With a desired rotational direction of the electric motor 10 or of the cooling fan 15, e.g. a green display surface 50 is visible. If the electric motor 10 and thus also the cooling fan 15 are operated in the wrong rotational direction, then the lamella 25 and the display arm 40 pivot in the respective opposite direction, so that the other display surface 55 is visible in the viewing window of the panel 80. In the embodiment example shown here, it is thereby the case e.g. of a red display surface 55 (FIGS. 2-4). With this, the rotational direction indicator is designed for the case that the desired rotational direction is already fixed. Alternatively, the rotational directions may also be specified on the display surfaces 50, 55.

The abutment 60 lying between the two display surfaces 50, 55 thereby limits the deflection of the onflow element 25. For this, the abutment 60, differently to the display surfaces 50, 55, is designed as projecting out of the viewing window of the panel 80. For this reason, the abutment 60, given an adequately large deflection of the onflow element 25, abuts on the panel 80 and limits the further rotation of the rotationally fixed system of the onflow element 25, the shaft 30 and the display element 35.

The rotational direction indicator 5 with the shaft 30 rotatably in the fork 70, is arranged between two cooling ribs 20.

The rotational direction indicator 5 is attached between two cooling ribs 20 in a manner such that the panel 80 with its plane surface comes to bear on the outer side of a housing 105 for covering the radial fan 15. The attachment of the rotational direction indicator 5 thereby is effected via a gap 100 which is formed by the distance between the panel 80 and the connection web 90. For this, the rotational direction indicator 5 is orientated such that the gap 100 between the fork 70 and panel 80 is opened at that axial end which faces in the direction of the shaft 30 of the lamella 25. In this manner, the housing 105 with its open side may be pushed axially into the gap 100, in a manner such that the inner side of the housing 105 comes to bear on the outer side of the fork 70. The housing 105 thereby peripherally surrounds the radial fan 15 and the axial end of the electric motor 10 and on the axial end which is away from the electric motor, comprises an end-face provided with openings. The other axial end of the housing 105 is thereby opened, so that the display arm 40 extends radially past the housing 105 and holds the panel 80 bearing on the outer side of the housing 105.

For positioning between the two cooling ribs 20, the rotational direction indicator 5 may be connected to the housing 105 with a positive fit via its connection web 90. For this, the connection web 90, on that side which comes to bear on the housing 105, comprises a locking groove 110 orientated perpendicularly to the longitudinal axis of the connection web 90. This locking groove 110 is formed for the positive-fit connection to a (non-shown) locking bead on the inner side of the housing 105, in which the locking bead locks into the locking groove 110.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A rotational direction indicator for an electric motor with a cooling fan, characterized in that the rotational direction indicator comprises an onflow element which may be moved between two positions and which may be arranged on an electric motor with a cooling fan, in a manner such that the onflow element is situated in an airflow of the cooling fan, whose direction depends on a rotational direction of the electric motor and is moved by the airflow in each case into one of its two positions, depending on a direction of the airflow, comprises a display unit which is designed for a visual display of the position of the onflow element and may be arranged on an outer side of the electric motor, and comprises a display actuating element which connects the display unit and the onflow element to one another, and transmits the position of the onflow element to the display unit, wherein the display actuator element comprises a shaft connecting the onflow element and the display unit, and a common centre of gravity of the onflow element, of the shaft and of the display unit, lies on an axis of the shaft.

* * * * *